(12) United States Patent
Hartwich

(10) Patent No.: US 7,467,823 B2
(45) Date of Patent: Dec. 23, 2008

(54) VEHICLE SEAT

(75) Inventor: Dirk Hartwich, Wuppertal (DE)

(73) Assignee: Johnson Controls GmbH, Burscheid (DE)

(*) Notice: Subject to any disclaimer, the term of this patent is extended or adjusted under 35 U.S.C. 154(b) by 0 days.

(21) Appl. No.: 10/552,405

(22) PCT Filed: Apr. 7, 2004

(86) PCT No.: PCT/EP2004/003722

§ 371 (c)(1),
(2), (4) Date: Apr. 27, 2006

(87) PCT Pub. No.: WO2004/089689

PCT Pub. Date: Oct. 21, 2004

(65) Prior Publication Data

US 2006/0290175 A1  Dec. 28, 2006

(30) Foreign Application Priority Data

Apr. 8, 2003 (DE) .............................. 103 16 275

(51) Int. Cl.
A47C 7/74 (2006.01)
(52) U.S. Cl. ................................. 297/180.14
(58) Field of Classification Search ............. 297/180.14
See application file for complete search history.

(56) References Cited

U.S. PATENT DOCUMENTS

| | | |
|---|---|---|
| 374,424 A | 12/1887 | Ober |
| 390,154 A | 9/1888 | Beach |
| 1,370,832 A | 3/1921 | Mollberg |
| 1,439,681 A | 12/1922 | Alkire et al. |
| 1,475,912 A | 11/1923 | Williams |
| 1,514,329 A | 11/1924 | Metcalf |
| 1,537,460 A | 5/1925 | Campbell et al. |
| 1,593,066 A | 7/1926 | Gaston |
| 1,664,636 A | 4/1928 | Mayer |
| 1,811,829 A | 6/1931 | Folberth et al. |
| 1,837,515 A | 12/1931 | Bachrach |
| 1,936,960 A | 11/1933 | Bowman |
| 2,012,042 A | 8/1935 | Gerlofson et al. |
| 2,022,959 A | 12/1935 | Gordon |
| 2,103,553 A | 12/1937 | Reynolds |
| 2,141,271 A | 12/1938 | Gerlofson |
| 2,158,801 A | 5/1939 | Petterson |
| 2,336,089 A | 12/1943 | Gould |
| 2,493,303 A | 1/1950 | McCullough |
| 2,544,506 A | 3/1951 | Kronhaus |
| 2,703,134 A | 3/1955 | Mossor |

(Continued)

FOREIGN PATENT DOCUMENTS

| | | |
|---|---|---|
| DE | 2 136 947 | 2/1973 |
| DE | 28 25 597 | 12/1978 |
| DE | 37 05 756 A1 | 10/1988 |
| DE | 40 01 207 A1 | 1/1990 |
| DE | 39 28 883 A1 | 3/1991 |

(Continued)

Primary Examiner—Rodney B. White
(74) Attorney, Agent, or Firm—Foley & Lardner LLP

(57) ABSTRACT

A vehicle seat having a seat part and a backrest is disclosed. At least one of the seat part and the back rest comprises a usable surface, an air supply opening, an air duct, and a ventilator. The air duct extends between the air supply opening and the usable surface. The ventilator is in communication with the air duct for producing an air flow in the air duct. The ventilator is coupled to the side of the at least one of the seat part and the backrest.

21 Claims, 10 Drawing Sheets

U.S. PATENT DOCUMENTS

| | | |
|---|---|---|
| 2,722,266 A | 11/1955 | Kersten |
| 2,726,658 A | 12/1955 | Chessey |
| 2,749,906 A | 6/1956 | O'Connor |
| 2,758,532 A | 8/1956 | Awe |
| 2,782,834 A | 2/1957 | Vigo |
| 2,791,956 A | 5/1957 | Guest |
| 2,826,135 A | 3/1958 | Benzick |
| 2,912,832 A | 11/1959 | Clark |
| 2,931,286 A | 4/1960 | Fry, Sr. et al. |
| 2,976,700 A | 3/1961 | Jackson |
| 2,978,972 A | 4/1961 | Hake |
| 2,992,604 A | 7/1961 | Trotman |
| 2,992,605 A | 8/1961 | Trotman et al. |
| 3,030,145 A | 4/1962 | Kottemann |
| 3,097,505 A | 7/1963 | Smith |
| 3,101,037 A | 8/1963 | Taylor |
| 3,101,660 A | 8/1963 | Taylor |
| 3,131,967 A | 5/1964 | Spaulding |
| 3,136,577 A | 6/1964 | Richard |
| 3,137,523 A | 6/1964 | Karner |
| 3,144,270 A | 8/1964 | Bilancia |
| 3,298,046 A | 1/1967 | Clementi et al. |
| 3,381,999 A | 5/1968 | Steere, Jr. |
| 3,486,177 A | 12/1969 | Marshack |
| 3,506,308 A | 4/1970 | Fenton |
| 3,529,310 A | 9/1970 | Olmo |
| 3,605,145 A | 9/1971 | Graebe |
| 3,628,829 A | 12/1971 | Heilig |
| 3,638,255 A | 2/1972 | Sterrett |
| 3,681,797 A | 8/1972 | Messner |
| 3,732,944 A | 5/1973 | Kendall |
| 3,736,022 A | 5/1973 | Radke |
| 3,757,366 A | 9/1973 | Sacher |
| 3,770,318 A | 11/1973 | Fenton |
| 3,778,851 A | 12/1973 | Howorth |
| 3,948,246 A | 4/1976 | Jenkins |
| 3,974,532 A | 8/1976 | Ecchuya |
| 3,987,507 A | 10/1976 | Hall |
| 4,002,108 A | 1/1977 | Drori |
| 4,008,498 A | 2/1977 | Thomas |
| 4,043,544 A | 8/1977 | Ismer |
| 4,060,276 A | 11/1977 | Lindsay |
| 4,072,344 A | 2/1978 | Li |
| 4,141,585 A | 2/1979 | Blackman |
| 4,143,916 A | 3/1979 | Trotman et al. |
| 4,149,285 A | 4/1979 | Stanton |
| 4,175,297 A | 11/1979 | Robbins et al. |
| 4,259,896 A | 4/1981 | Hayashi et al. |
| 4,391,009 A | 7/1983 | Schild et al. |
| 4,413,857 A | 11/1983 | Hayashi |
| 4,509,792 A | 4/1985 | Wang |
| 4,522,447 A | 6/1985 | Snyder et al. |
| 4,589,656 A | 5/1986 | Baldwin |
| 4,629,253 A | 12/1986 | Williams |
| 4,671,567 A | 6/1987 | Frobose |
| 4,673,605 A | 6/1987 | Sias et al. |
| 4,685,727 A | 8/1987 | Cremer et al. |
| 4,686,724 A | 8/1987 | Bedford |
| 4,712,832 A | 12/1987 | Antolini et al. |
| 4,719,764 A | 1/1988 | Cook |
| 4,729,598 A | 3/1988 | Hess |
| 4,847,933 A | 7/1989 | Bedford |
| 4,852,934 A | 8/1989 | Yasuda et al. |
| 4,853,992 A | 8/1989 | Yu |
| 4,866,800 A | 9/1989 | Bedford |
| 4,923,248 A | 5/1990 | Feher |
| 4,946,220 A | 8/1990 | Wyon et al. |
| 4,980,940 A | 1/1991 | Isshiki |
| 4,981,324 A | 1/1991 | Law |
| 4,997,230 A | 3/1991 | Spitalnick |
| 5,002,336 A | 3/1991 | Feher |
| 5,004,294 A | 4/1991 | Lin |
| 5,016,302 A | 5/1991 | Yu |
| 5,079,790 A | 1/1992 | Pouch |
| 5,102,189 A | 4/1992 | Saito et al. |
| 5,106,161 A | 4/1992 | Meiller |
| 5,138,851 A | 8/1992 | Mardikian |
| 5,160,517 A | 11/1992 | Hicks et al. |
| 5,163,737 A | 11/1992 | Navach et al. |
| 5,211,697 A | 5/1993 | Kienlein et al. |
| 5,226,188 A | 7/1993 | Liou |
| 5,292,577 A | 3/1994 | Van Kerrebrouck et al. |
| 5,335,381 A | 8/1994 | Chang |
| 5,354,117 A | 10/1994 | Danielson et al. |
| 5,356,205 A | 10/1994 | Calvert et al. |
| 5,370,439 A | 12/1994 | Lowe et al. |
| 5,372,402 A | 12/1994 | Kuo |
| 5,382,075 A | 1/1995 | Shih |
| 5,385,382 A | 1/1995 | Single, II et al. |
| 5,403,065 A | 4/1995 | Callerio |
| 5,408,711 A | 4/1995 | McClelland |
| 5,411,318 A | 5/1995 | Law |
| 5,416,935 A | 5/1995 | Nieh |
| 5,522,106 A | 6/1996 | Harrison et al. |
| 5,544,942 A | 8/1996 | Vu Khac et al. |
| 5,561,875 A | 10/1996 | Graebe |
| 5,590,428 A | 1/1997 | Roter |
| 5,597,200 A | 1/1997 | Gregory et al. |
| 5,613,729 A | 3/1997 | Summer, Jr. |
| 5,613,730 A | 3/1997 | Buie et al. |
| 5,626,386 A | 5/1997 | Lush |
| 5,626,387 A | 5/1997 | Yeh |
| 5,640,728 A | 6/1997 | Graebe |
| 5,645,314 A | 7/1997 | Liou |
| 5,692,952 A | 12/1997 | Chih-Hung |
| 5,715,695 A | 2/1998 | Lord |
| 5,787,534 A | 8/1998 | Hargest et al. |
| 5,833,309 A | 11/1998 | Schmitz |
| 5,833,321 A | 11/1998 | Kim et al. |
| 5,850,648 A | 12/1998 | Morson |
| 5,902,014 A | 5/1999 | Dinkel et al. |
| 5,918,930 A | 7/1999 | Kawai et al. |
| 5,921,100 A | 7/1999 | Yoshinori et al. |
| 5,921,314 A | 7/1999 | Schuller et al. |
| 5,921,858 A | 7/1999 | Kawai et al. |
| 5,924,766 A | 7/1999 | Esaki et al. |
| 5,924,767 A | 7/1999 | Pietryga |
| 5,927,817 A | 7/1999 | Ekman et al. |
| 5,934,748 A | 8/1999 | Faust et al. |
| 6,003,950 A * | 12/1999 | Larsson ............ 297/180.14 X |
| 6,019,420 A | 2/2000 | Faust et al. |
| 6,048,024 A | 4/2000 | Wallman |
| 6,059,018 A | 5/2000 | Yoshinori et al. |
| 6,062,641 A | 5/2000 | Suzuki et al. |
| 6,068,332 A | 5/2000 | Faust et al. |
| 6,106,057 A * | 8/2000 | Lee ................ 297/180.14 |
| 6,109,688 A | 8/2000 | Wurz et al. |
| 6,145,925 A * | 11/2000 | Eksin et al. ........... 297/180.14 |
| 6,152,534 A | 11/2000 | Maeda et al. |
| 6,179,706 B1 | 1/2001 | Yoshinori et al. |
| 6,186,592 B1 | 2/2001 | Orizaris et al. |
| 6,189,966 B1 | 2/2001 | Faust et al. |
| 6,189,967 B1 | 2/2001 | Short |
| 6,196,627 B1 | 3/2001 | Faust et al. |
| 6,206,465 B1 | 3/2001 | Faust et al. |
| 6,224,150 B1 | 5/2001 | Eksin et al. |
| 6,277,023 B1 | 8/2001 | Schwarz |
| 6,291,803 B1 | 9/2001 | Fourrey |
| 6,439,658 B1 * | 8/2002 | Ganz et al. ........... 297/180.14 |
| 6,478,369 B1 * | 11/2002 | Aoki et al. ........... 297/180.13 |
| 6,481,801 B1 | 11/2002 | Schmale |
| 6,505,886 B2 * | 1/2003 | Gielda et al. ........... 297/180.13 |
| 6,511,125 B1 | 1/2003 | Gendron |
| 6,541,737 B1 | 4/2003 | Eksin et al. |

| | | |
|---|---|---|
| 6,546,578 B1 | 4/2003 | Steinmeier |
| 6,578,910 B2 | 6/2003 | Andersson et al. |
| 6,604,785 B2 * | 8/2003 | Bargheer et al. ........ 297/180.14 |
| 6,619,736 B2 | 9/2003 | Stowe et al. |
| 6,619,737 B2 | 9/2003 | Kunkel et al. |
| 6,626,488 B2 | 9/2003 | Pfahler |
| 6,629,724 B2 | 10/2003 | Ekern et al. |
| 6,629,725 B1 | 10/2003 | Kunkel et al. |
| 6,644,735 B2 * | 11/2003 | Bargheer et al. ........ 297/180.13 |
| 6,676,207 B2 | 1/2004 | Rauh et al. |
| 6,682,140 B2 * | 1/2004 | Minuth et al. .......... 297/180.14 |
| 6,761,399 B2 * | 7/2004 | Bargheer et al. ........ 297/180.12 |
| 6,786,541 B2 | 9/2004 | Haupt et al. |
| 6,793,016 B2 | 9/2004 | Aoki et al. |
| 6,808,230 B2 * | 10/2004 | Buss et al. ............. 297/180.12 |
| 6,840,576 B2 | 1/2005 | Ekern et al. |
| 6,869,139 B2 * | 3/2005 | Brennan et al. .......... 297/180.1 |
| 6,869,140 B2 | 3/2005 | White et al. |
| 6,928,829 B2 | 8/2005 | Kamiya et al. |
| 6,929,322 B2 | 8/2005 | Aoki et al. |
| 7,083,227 B2 * | 8/2006 | Brennan et al. ........ 297/180.14 |
| RE39,394 E * | 11/2006 | Suzuki et al. ............ 297/180.1 |
| 7,131,689 B2 * | 11/2006 | Brennan et al. ........ 297/180.14 |
| 7,229,129 B2 * | 6/2007 | White et al. ........... 297/180.12 |
| 2001/0035669 A1 | 11/2001 | Andersson et al. |
| 2002/0003362 A1 | 1/2002 | Kunkel et al. |
| 2002/0096915 A1 | 7/2002 | Haupt et al. |
| 2002/0096931 A1 | 7/2002 | White et al. |
| 2002/0140258 A1 | 10/2002 | Ekern et al. |
| 2003/0039298 A1 | 2/2003 | Eriksson et al. |
| 2003/0214160 A1 | 11/2003 | Brennan et al. |
| 2003/0230913 A1 | 12/2003 | Buss et al. |
| 2004/0189061 A1 | 9/2004 | Hartwich et al. |
| 2005/0066505 A1 | 3/2005 | Iggbal et al. |
| 2005/0070219 A1 | 3/2005 | Wollenhaupt et al. |
| 2005/0082885 A1 | 4/2005 | Thunissen et al. |
| 2005/0085968 A1 | 4/2005 | Panic |
| 2005/0121966 A1 | 6/2005 | White et al. |
| 2005/0161986 A1 | 7/2005 | Brennan et al. |
| 2005/0178755 A1 | 8/2005 | Ulbrich |
| 2005/0243331 A1 | 11/2005 | Ishima et al. |

FOREIGN PATENT DOCUMENTS

| | | |
|---|---|---|
| DE | 196 07 110 A1 | 8/1997 |
| DE | 197 36 951 A1 | 3/1999 |
| DE | 198 10 936 A1 | 9/1999 |
| DE | 198 51 979 A1 | 5/2000 |
| DE | 199 54 978 C1 | 1/2001 |
| DE | 100 01 314 A1 | 7/2001 |
| DE | 200 02 540 U1 | 8/2001 |
| DE | 197 45 521 A1 | 12/2001 |
| DE | 199 47 567 A1 | 1/2003 |
| EP | 0 345 806 A2 | 6/1989 |
| EP | 0 936 105 A1 | 8/1999 |
| EP | 1 075 984 B1 | 2/2001 |
| EP | 1 123 834 A1 | 8/2001 |
| EP | 1 086 852 B1 | 1/2004 |
| FR | 1.266.925 | 6/1961 |
| FR | 2.630.056 A1 | 10/1989 |
| FR | 2.686.299 A1 | 1/1992 |
| GB | 2 076 648 | 12/1981 |
| JP | 52 062560 | 5/1977 |
| JP | 01 172012 | 6/1989 |
| JP | 08 028797 | 2/1996 |
| WO | WO 96/05475 A1 | 2/1996 |
| WO | WO 99/50090 | 10/1999 |
| WO | WO 01/05623 A1 | 6/2000 |
| WO | WO 02/06914 A1 | 1/2002 |
| WO | WO 03/011633 A1 | 7/2002 |
| WO | WO 03/051666 A1 | 12/2002 |
| WO | WO 2004/089689 A1 | 10/2004 |
| WO | WO 2005/073021 A2 | 8/2005 |

* cited by examiner

VEHICLE SEAT

CROSS-REFERENCE TO RELATED APPLICATIONS

This application is the U.S. National Stage Application of PCT Application No. PCT/EP2004/003722, filed Apr. 7, 2004, and claims the benefit of and priority to German Application No. DE 10316275.5, filed Apr. 8, 2003.

BACKGROUND

The invention relates to climatic vehicle seats.

Motor vehicles, in particular, are increasingly equipped with comfort functions, thus making their use easier, for example in the case of high outside temperatures and/or great solar irradiation. The use of what are referred to as climatic seats in motor vehicles is generally known. Such climatic seats are provided in such a manner that usable surfaces, i.e., generally those surfaces which a user touches, for example, by sitting on or leaning against, are provided in a manner such that their surface temperature can be selected and, in particular, permit cooling or heating of the usable surfaces. In this connection, a cooling of the usable surfaces is brought about by an airflow in the vehicle seat, said airflow ensuring that heat is removed from the usable surfaces.

For example, German Utility Model DE 200 02 540 U1 discloses a seat cushion part for vehicle seats which is provided with a molded part of an air-permeable material and a ventilation device arranged on a rear side of the molded part and which is provided in the above-stated manner in order to cool the surface of the seat cushion part. However, due to the arrangement of the ventilation device on the rear side of the seat, a vehicle seat of this type has a large construction volume, which is disadvantageous in terms of its usability in vehicles, in particular, with regard to costs.

SUMMARY

One object of the invention is to provide a vehicle seat which can be adjusted in temperature and has a very small construction volume or a very small construction depth, particularly with regard to the thickness of its backrest and with regard to the overall height of its substructure. Furthermore, with the air-conditioning system which is generally present in the vehicle, the intention is for the temperature-controlled air to be transported as directly as possible from the vehicle interior in order to cool seat surfaces of the climatic seat. A further object is to bring the air cooling the usable surfaces to the entire surface to be cooled as far as possible without an additional air distributing layer, which further reduces the construction depth of the seat. Furthermore, the climatic seat is to be operated in such a manner that, on the one hand, a rapid cooling is possible but, on the other hand, during the "normal operation" of a vehicle interior at "comfort temperature" an excessive cooling capacity is not possible, so that overcooling, which is possibly harmful to a user, is largely avoided.

How these objects are achieved will be described herein. For this purpose, firstly, a vehicle seat according to one exemplary embodiment having a ventilator, a usable surface and an air supply opening is provided, in which the ventilator produces a directed airflow in an air duct which is situated between the usable surface and the air distributing opening and divides into at least two air duct arms, the ventilator being arranged on the side of the vehicle seat when the vehicle seat is oriented in the direction of travel of the vehicle. A vehicle seat according to another exemplary embodiment having a usable surface and an air supply opening is provided, the usable surface being connected to the air supply opening via at least one air duct, with a directed airflow being provided in the air duct, and with a reduction in the cross section of the air duct being provided in a direction starting from the air supply opening to the usable surface.

According to another exemplary embodiment, a method is provided for controlling the strength of the heat transfer capacity of an airflow in an air duct of a vehicle seat, which is used in a vehicle, the heat transfer capacity of the airflow being provided as a function of whether a measured actual temperature of the interior of the vehicle is above a predetermined desired temperature of the vehicle. By this means, the climatic power of the seat can be controlled via the interior temperature of the vehicle. According to a preferred embodiment, the strength of the airflow is used as a measure of the strength of the heat transfer capacity of the airflow. This is advantageous because the strength of the airflow is a particularly easily accessible variable, together with the decisive difference in temperature, with influence on the heat transfer capacity. According to another preferred embodiment, two airflows of different strengths are possible, the stronger airflow being set only in the event the actual temperature of the vehicle significantly exceeds the desired temperature of the vehicle and, in the event the actual temperature of the vehicle is in the region of the desired temperature of the vehicle, it is possible only to set airflow strengths which lie in the region of the weaker of the two airflows of different strengths. This avoids users of the vehicle seat becoming overcooled, which may have an adverse effect on their health.

BRIEF DESCRIPTION OF THE DRAWINGS

The vehicle seat is explained in more detail below with reference to exemplary embodiments illustrated in the drawings, in which.

DETAILED DESCRIPTION OF THE EXEMPLARY AND ALTERNATIVE EMBODIMENTS

Figure 1:
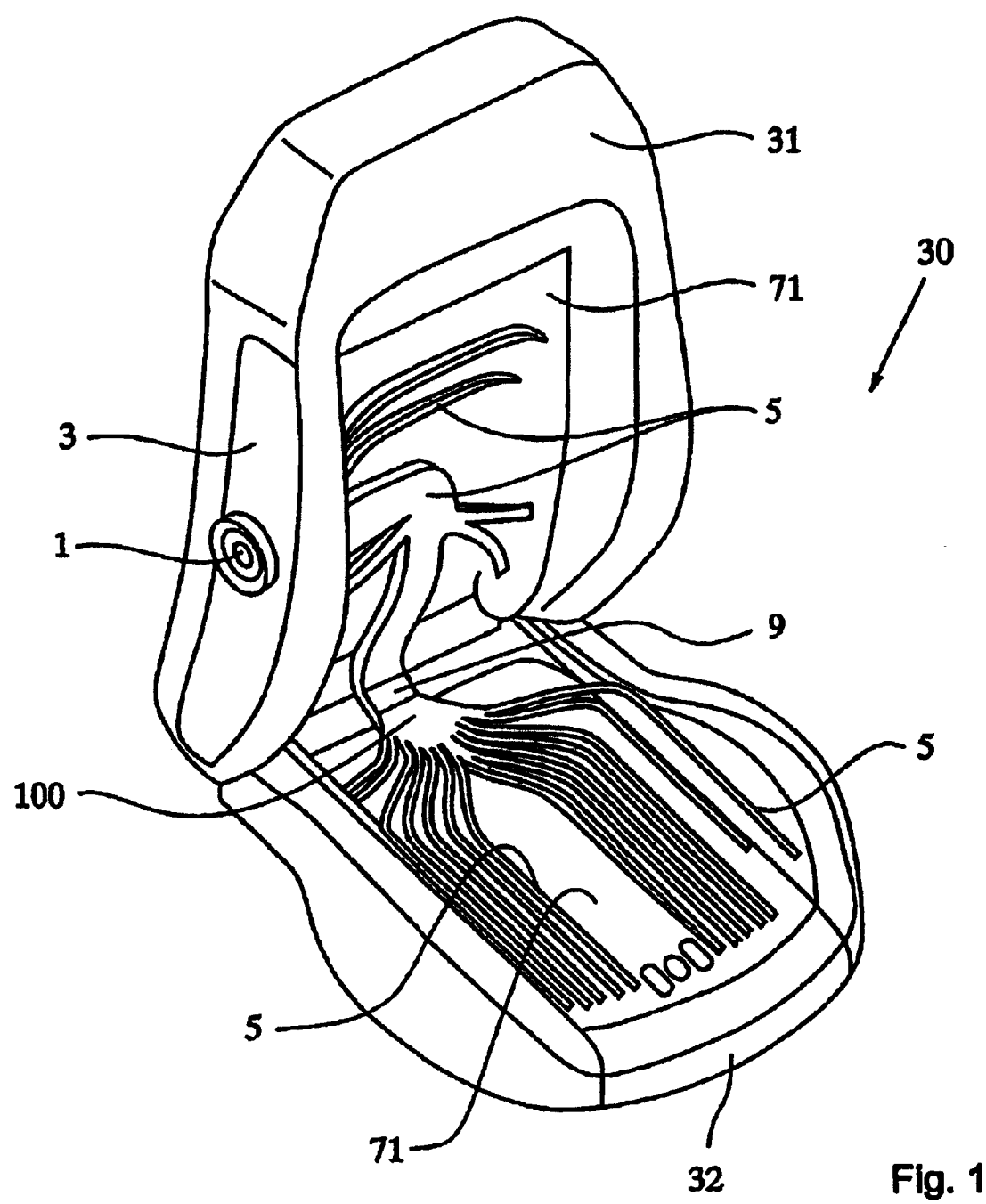
FIGS. 1 and 1a show a vehicle seat according to one exemplary embodiment in a perspective illustration together with enlargements of details.
Figure 1A:
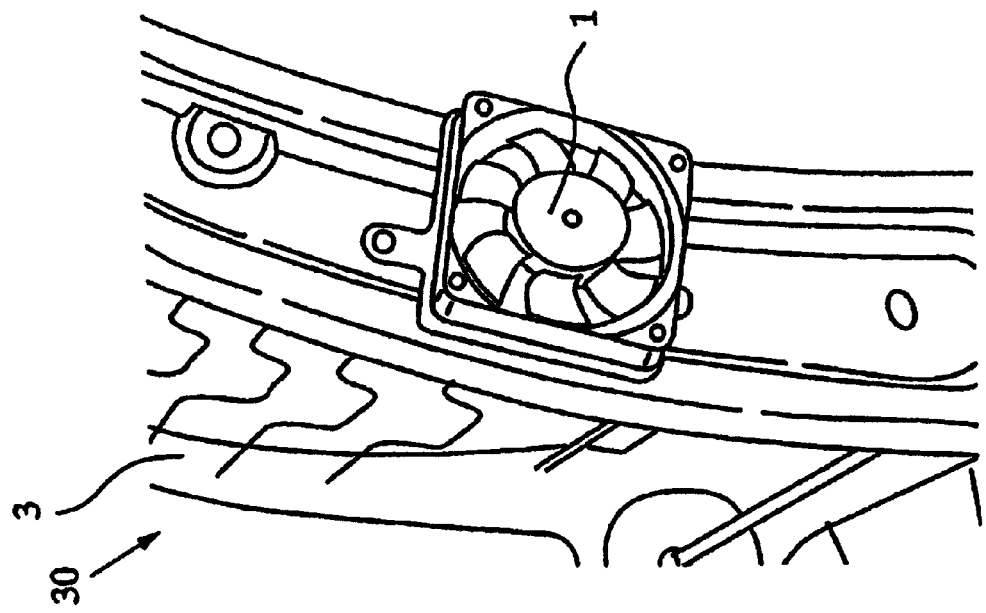
Figure 1A:
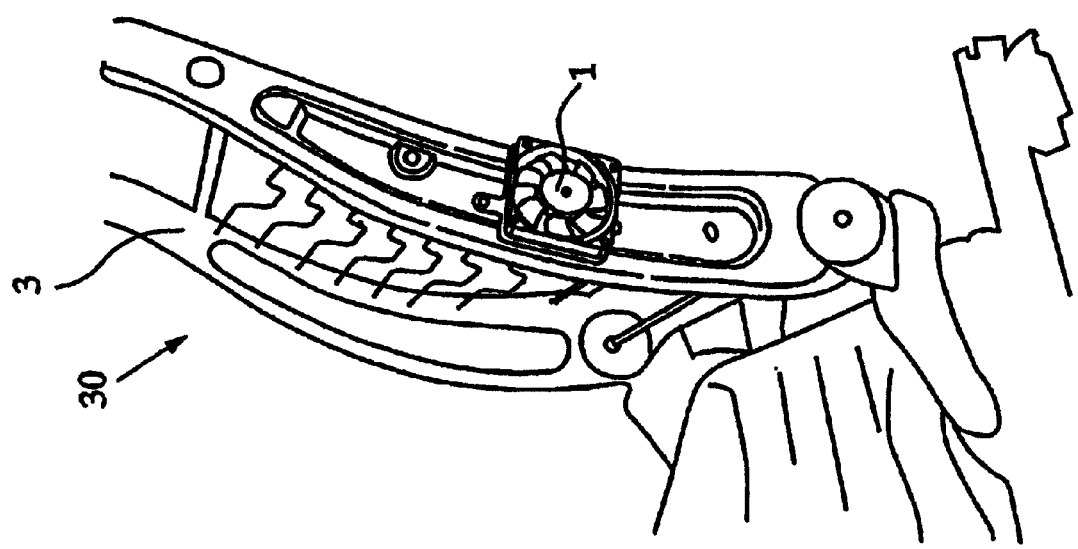

FIG. 1 illustrates a vehicle seat 30 according to one exemplary embodiment in a perspective illustration. According to one exemplary embodiment, the vehicle seat 30, or seat 30 for short, is provided as a climatic seat 30 and comprises, for example, a backrest 31 and a seat part 32. The backrest 31 has, for example, a backrest structure 3 and an upholstery (not denoted with a reference number). Similarly, the seat part 32 has a seat part structure (not denoted with a reference number) and an upholstery (likewise not denoted with a reference number). The seat 30 furthermore has a ventilator 1, which is also referred to below as a fan 1. According to one exemplary embodiment, the fan 1 is fitted at the side of the backrest structure 3 or the seat part structure. As an alternative, the fan 1 may also be fastened to the upholstery of the backrest 31 or the upholstery of the seat part 32. An air-duct 5 leads from the fan 1 to various points of the usable surface 71, with part of the usable surface 71 being provided on the backrest 31 and part of the usable surface 71 being provided on the seat part 32. In the embodiment of FIG. 1, only a single fan is provided on the backrest 31. In order to supply the usable surface 71 of the seat part 32, a flexible connecting element 9 is provided which makes up part of the air duct 5 and which is directly adjoined by a distributing section 100 of the air duct 5. FIG. 1a illustrates two enlargements of details of the seat 30, in which the upholstery of the backrest 31 and of the seat part 32 is not fitted, so that the backrest structure 3 and the lateral fitting of the fan 1 to the backrest structure 3 can be better seen.

Figure 2:
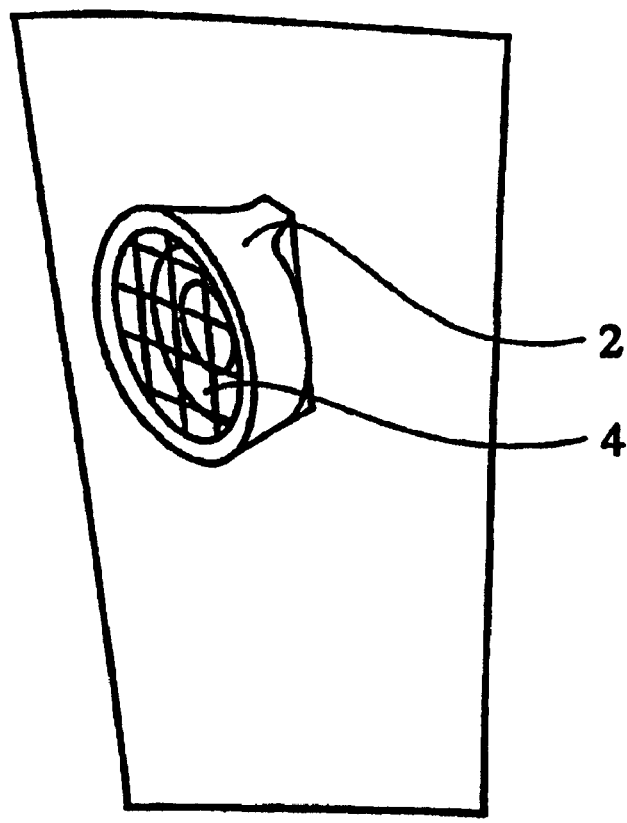
FIG. 2 shows two detailed views of an air supply opening of a vehicle seat according to another exemplary embodiment.
Figure 2:
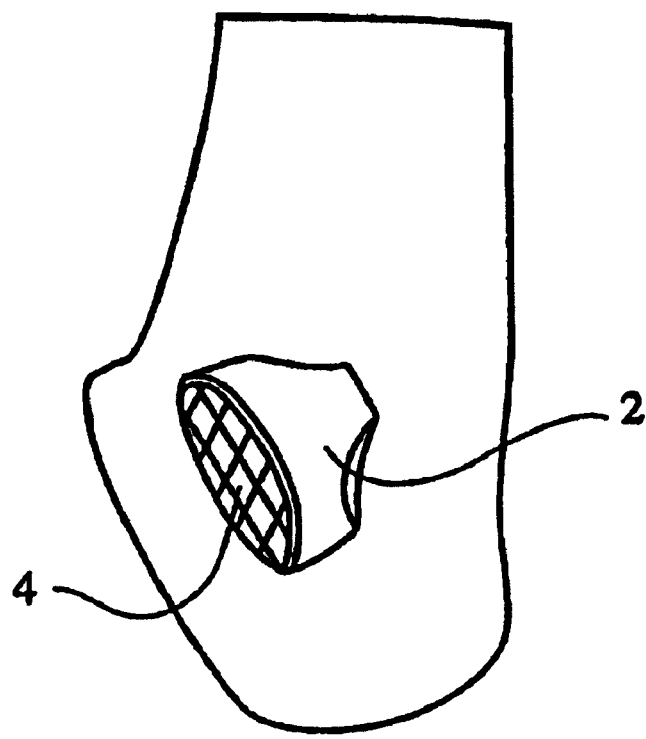

FIG. 2 illustrates two detailed views of an air supply opening of the climatic seat 30. The air supply opening comprises a grille 4 and a funnel 2. The air supply opening 2, 4 is connected to the fan 1 and, in the example, is fastened to the side of the backrest structure 3 (not illustrated in FIG. 2). The funnel 2 is preferably optimized in terms of ventilation. In the example, the fan is provided as a blowing fan 1, with the fan 1 sucking in air through the air supply opening 2, 4 and blowing it into the air duct 5. The grille 4 may alternatively also be provided as an air-permeable fabric, or an air-permeable fabric may be provided on the air supply opening 2, 4 in addition to the grille 4—in particular for "prefiltering" the air blown into the air duct 5. Of course, it is also possible to use a sucking fan instead of a blowing fan; the operating direction of the fan would merely be reversed.

According to one exemplary embodiment, just one fan 1 or one fan module is fastened to the side of the backrest structure 3 or to the backrest upholstery. This lateral arrangement—similar to an airbag module—makes it possible to realize a climatic seat 30 with a very small construction depth—i.e. the construction depth of the backrest 31 and of the seat part 32. According to an alternative embodiment, the fan 1 may also be positioned at the side of the seat part structure. In both cases, the air flows in the air duct 5 approximately parallel to the usable surface 71 (for example, parallel to the seat surface for the seat part 32) into the seat 30 and thus reduces flow losses so that the use of a smaller fan 1 or the use of fewer fans 1 is possible (in comparison to a substantially vertical flow-in direction relative to the particular usable surface 71). This manner of approach flow also reduces the acoustic problem produced by the different loading of the seat 30 between the "occupied" state and the "unoccupied" state of the seat 30. This is because, in the event of a largely vertical approach flow to the particular usable surface 71 (i.e., the airflow is guided by the fan 1 directly to the usable surface 71, for example, to the seat surface), severe fluctuations arise in the air resistance in the air duct between unoccupied and occupied seat 30 and these lead to unpleasant and annoying noises.

Figure 3:
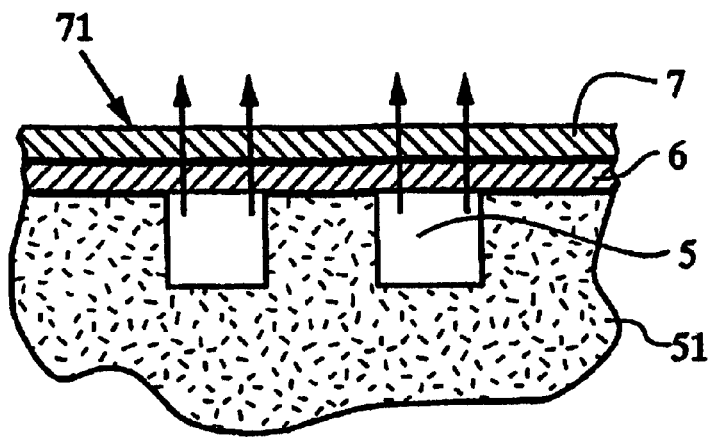
FIGS. 3 and 3a show sectional illustrations of the vehicle seat between the air duct and the usable surface according to two different embodiments.
Figure 3A:
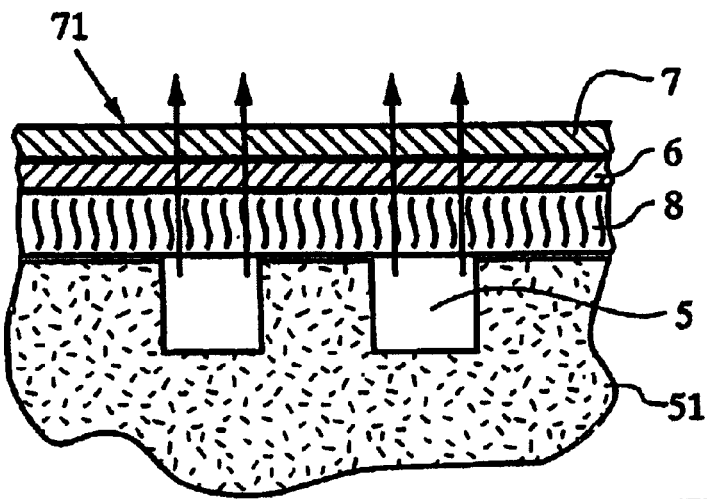

FIGS. 3 and 3a illustrate two sectional illustrations in order to illustrate two alternative constructions of the climatic seat 30 between the air duct 5 and the usable surface 71. According to one exemplary embodiment, the air duct 5 is divided, starting from the air supply opening 2, 4, into a plurality of air duct arms. FIGS. 3 and 3a illustrate in each case two air duct arms of this type as sections of the air duct 5, in cross section. According to one exemplary embodiment, the shape of the air duct 5 and of its air duct arms is achieved, for example, by a foam material 51 being provided in such a manner with an appropriate shape that the air duct 5 is formed when the foam material 51 is covered by further layers of material. In a first variant construction of the seat 30 according to FIG. 3, an air-permeable and perforated layer 6, in which, for example, the seat heating system 6 of the seat 30 is accommodated, is provided above the air duct 5, i.e., above the foam material 51. An air-permeable top material 7 or a top fabric 7 of the seat 30 is provided above the seat heating system 6. A good climatic capacity is possible with this construction of the seat 30. In a second variant construction of the seat 30 according to FIG. 3a, in contrast to the first variant construction, an air distributing layer 8, for example of rubberized hair or a spacer knit, is also provided between the air duct 5 and the seat heating system 6 and assists with the fine distribution of the air. The air duct 5 is provided such that it is branched in its air duct arms. By this means, all of the essential points of the usable surface 71 are reached by air duct arms. It is particularly provided, according to one exemplary embodiment, that the very finest arms of the air duct 5 are guided into the side region of the seat upholstery and also make it possible for the temperature to be controlled for the user there. Owing to the first variant construction, it is not necessary to provide an air distributing layer 8 above the air duct 5, but the seat 30 does make this possible (second variant construction). The omission of the air distributing layer 8 has the advantage of reducing the construction depth of the seat 30. In order to achieve a high air throughput in the seat 30, materials having a high air throughput capacity over the air ducts should be used. There should therefore be as few layers as possible. In cases in which a seat heating system 6 is not required, the layer 6 accommodating the seat heating system 6 can be realized by means of an air-permeable and perforated nonwoven material or a corresponding different material. The seat heating system 6 or the layer 6 replacing it may be adhesively bonded to the upper side of the foam material 51 in order to form a supporting layer 6 over the air ducts. This "bridge effect" helps to avoid the top fabric 7 collapsing into the air duct 5 or into its air duct arms. The "bridge effect" may be assisted by the use of rubberized hair, in particular in an air distributing layer 8.

Figure 4:
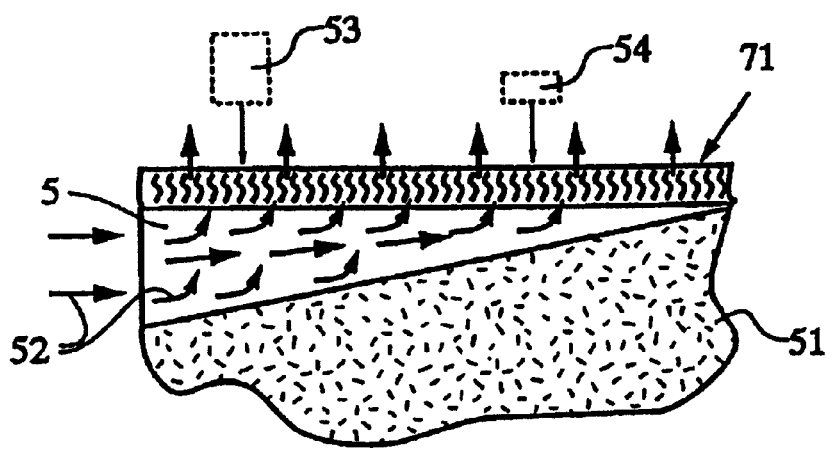
FIGS. 4, 4a, 4b show sectional illustrations of part of an air duct according to different embodiments of the air duct, and a plan view of the second embodiment of the air duct in the "occupied" state.
Figure 4A:
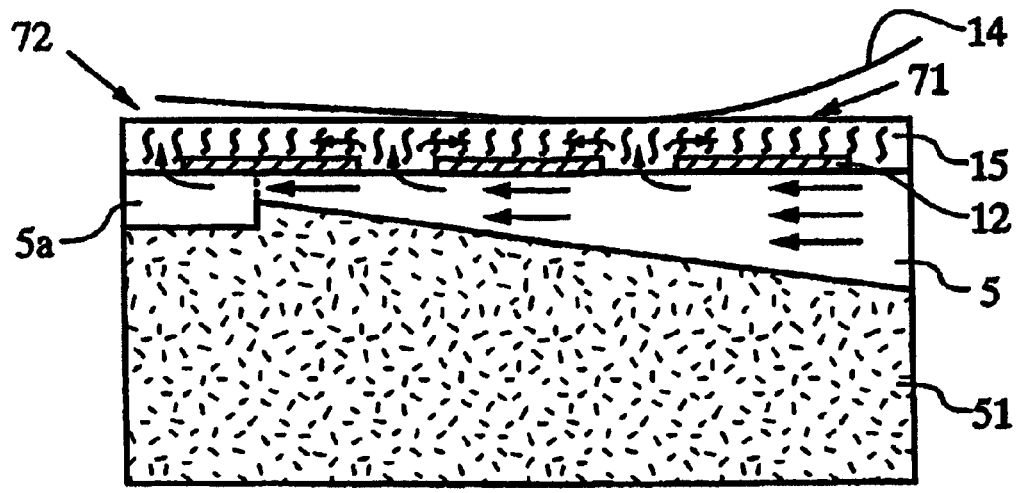

FIGS. 4 and 4a illustrate sectional illustrations of part of an air duct 5 along the direction of flow of the air in the air duct 5 in two alternative embodiments of the air duct 5. In order to provide the climatic seat 30 with sufficient cooling capacity and with just a single fan 1, the air duct 5 should be optimized in terms of flow. According to a first embodiment of the air duct 5 (illustrated in FIG. 4), the arms of the air duct 5 are designed in such a manner that the counterpressure in the arms continuously increases and therefore some of the air flows onto the seat surface 71. The layer construction above the air duct 5 is illustrated schematically in FIGS. 4 and 4a and without a reference number of the layer covering the air duct 5. According to various alternative and exemplary embodiments, the increase in the counterpressure in the air duct 5 is achieved in particular by the cross section of the air duct 5 being continuously reduced in the air duct arms in a direction starting from the air supply opening 2, 4 to the usable surface 71—i.e. in the direction of flow of the air that is indicated in FIG. 4 by airflow arrows 52. FIG. 4 illustrates, by way of example, two different cross-sectional areas 53, 54 of the air duct 5 at different points of the air duct 5 along the direction of flow of the air. In the case of a rectangular shape of the air duct 5, which shape is illustrated by way of example in FIG. 4, this reduction in the cross section of the air duct 5 in its air duct arms is obtained, in particular, by the fact that the height of the air duct 5 is reduced in the direction of flow of the air and the width is maintained.

Figure 4B:
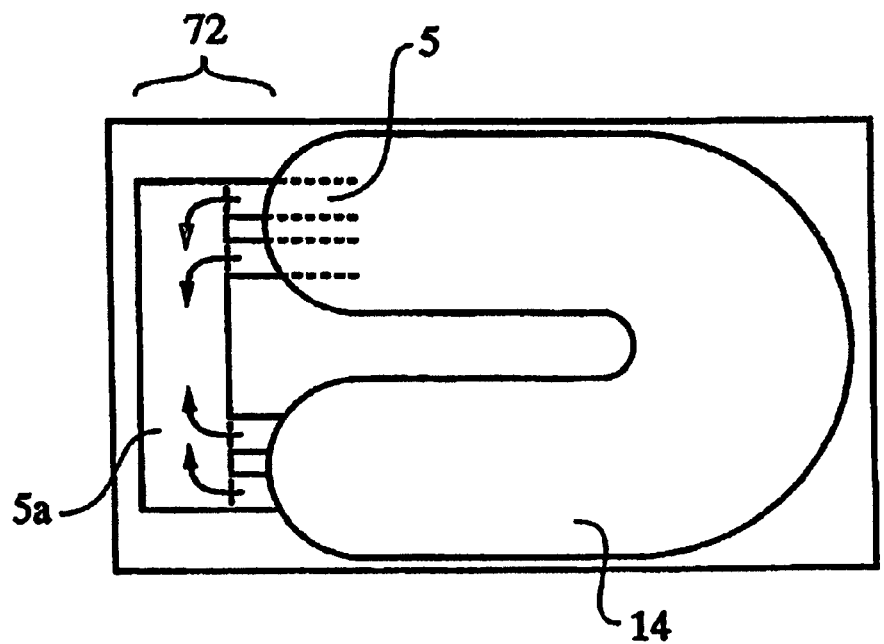

FIG. 4a illustrates a second embodiment of an arm of the air duct 5. In this case, the upper side of the air duct 5 is partially closed in its air duct arms by a nonwoven fabric and is opened upwards only at certain intervals. The points closing the air duct 5 are provided with the reference number 12 in FIG. 4a. Furthermore, an air-permeable covering layer 15 or upholstery 15 is provided. The reference number 14 denotes the area of a seat user, for example his posterior, which comes into contact with the usable surface 71 of the seat 30. The reduction in the cross section of the air duct 5 causes the pressure in the air duct 5 to rise. If the pressure resistance of the upholstery 15 is smaller than the pressure resistance in the air duct 5, the air is guided in the direction of the seat surface. By means of a relatively air-impermeable material, such as, for example, a nonwoven fabric 12 which has an open, i.e. air-permeable, structure only in part, the build-up of pressure in the air duct 5 can be further intensified. In order, however, not to allow the air resistance in the state of an occupied seat 30 to rise too severely, it is ensured by means of a pressure limiting section 5a of the air duct and a cross-sectional increase, taking place in the pressure limiting section 5a, in a region 72 of the seat surface so that is not generally used by a user 14 as a seat surface that a sufficiently large amount of air can flow out of the seat surface. In this regard, FIG. 4b illustrates a plan view of the second embodiment of the air duct 5 in the state occupied by a user 14.

Figure 5:
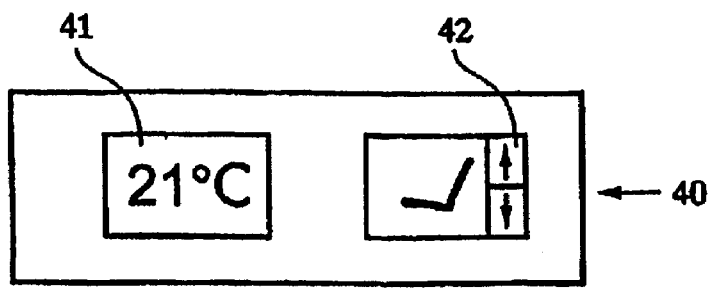
FIG. 5 shows an operating unit according to one exemplary embodiment for controlling the climatic seat.

FIG. 5 illustrates an example of an operating unit 40 for controlling the climatic seat 30. A display 41 of the interior temperature of the vehicle is illustrated on the left side, and an adjustment possibility 42 for the temperature of the seat 30 is provided on the right side. The interior temperature of the vehicle and the seat temperature of the vehicle generally have a certain difference in temperature (usually the interior temperature of the vehicle is approx. 21° C. and the seat temperature of the vehicle is approx. 14° C. above it) and the seat temperature of the vehicle being adjustable within certain limits in accordance with the user's requirements.

Figure 6:
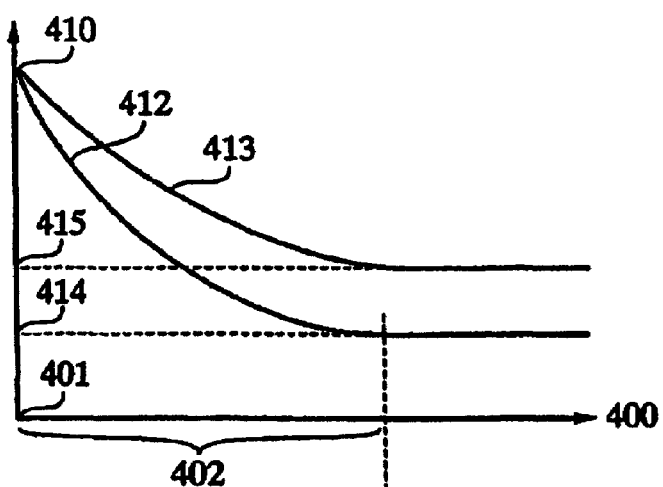
FIGS. 6, 7 and 8 show a temperature diagram, a diagram of the rotational speed of the fan, and a heat flow diagram.
Figure 7:
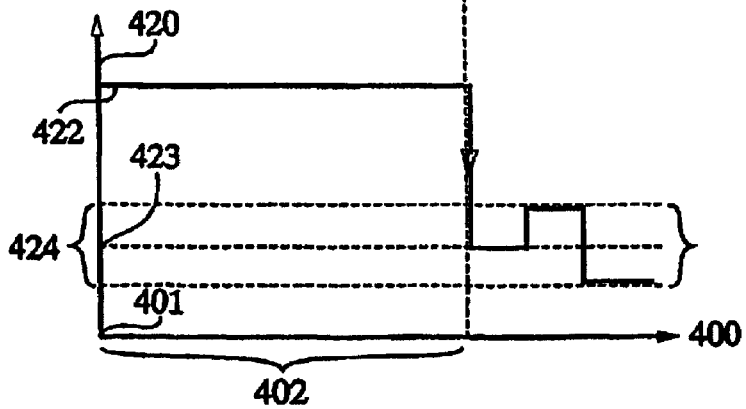
Figure 8:
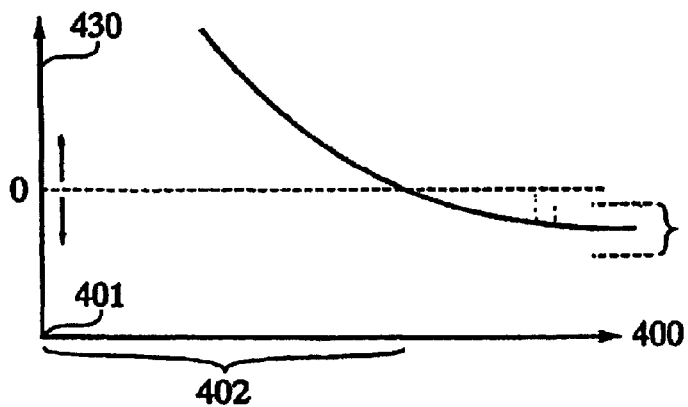

FIG. 6 illustrates a temperature diagram for a cooling curve of a vehicle having a climatic seat 30, FIG. 7 illustrates a diagram of the rotational speed of the fan, and FIG. 8 illustrates a heat flow diagram. The diagrams are arranged under one another in the stated sequence and depict time profiles of the temperature 410, of the rotational speed of the fan 420, and of the heat flow 430. The axis denoted by the reference number 400 is therefore a time axis. The starting point in time of the diagrams is provided in each case with the reference number 401 and depicts the state of a vehicle which has been overheated, for example, due to strong solar irradiation. FIG. 6 illustrates a temperature curve 412 of the interior and a temperature curve 413 of the seat. The interior is cooled, for example, by an air-conditioning system (not illustrated), thus resulting in a reduction in the interior temperature 412 in the time profile 400 of FIG. 6. At the same time, the climatic seat 30 according to one exemplary embodiment, and in particular its fan 1, is activated at high power, which is demonstrated by way of a comparatively high first rotational speed of the fan 422 during a cooling phase, which is denoted in all of the diagrams by the reference number 402. By means of the action of the comparatively large first rotational speed of the fan 422, the heat transfer capacity 430 or the heat flow 430 from the seat 30 to the user of the seat 30 drops severely during the cooling phase 402 until it has sunk to approximately zero at the end of the cooling phase 402, i.e., the user is no longer heated by the seat 30. When a comfort temperature range around an interior comfort temperature 414 of the interior or around a seat comfort temperature 415 for the seat 30 is reached, which is likewise the case approximately at the end of the cooling phase 402, the fan power or the rotational speed of the fan 420 is reduced from its first value 422 to a second rotational speed of the fan 423. As a consequence of the time profile 400, the rotational speed of the fan 420 can still vary but only in the range 424 of the second rotational speed of the fan 423 if the interior comfort temperature is not decisively exceeded by the interior temperature (for example because of renewed solar irradiation with the air-conditioning system switched off). The exclusive variation of the rotational speed of the fan 420 in the range 424 of the second rotational speed of the fan 423 takes place in order to prevent excessive cooling or overcooling of a user of the seat 30. Since every individual has an individual temperature sensitivity, it is made possible for a user of the seat 30 to vary the seat temperature in a predetermined bandwidth by means of a variation of the heat transfer capacity of the seat 30 and therefore a variation of the heat flow 430. A variation of the heat transfer capacity can also take place on the basis of a sensor signal which originates from a sunlight sensor, which is denoted with the reference number 416 in FIG. 13. This variation of the heat transfer capacity of the seat 30 is brought about, according to one exemplary embodiment, via a variation of the strength of the airflow in the air duct 5 of the seat 30, which is provided via a variation of the rotational speed of the fan in the range 424 about the second rotational speed of the fan 423. The first rotational speed of the fan 422 therefore corresponds to a first strength of the airflow in the air duct 5, and the second rotational speed of the fan 423 corresponds to a second strength of the airflow in the air duct 5 of the seat 30. According to one exemplary embodiment, the interior temperature of the vehicle is generally controlled via a temperature sensor 411 illustrated in FIG. 13. In this case, the sensor 411 is arranged, in particular, in the central console of the vehicle or on the A or B-pillar. This sensor 411 determines the current interior temperature of the vehicle, the "actual temperature of the vehicle", which is compared with the desired interior temperature of the vehicle, the "desired temperature of the vehicle", which is set via the operating unit 40. The air-conditioning system (not illustrated) of the vehicle is then controlled by means of these temperature values.

Figure 9:
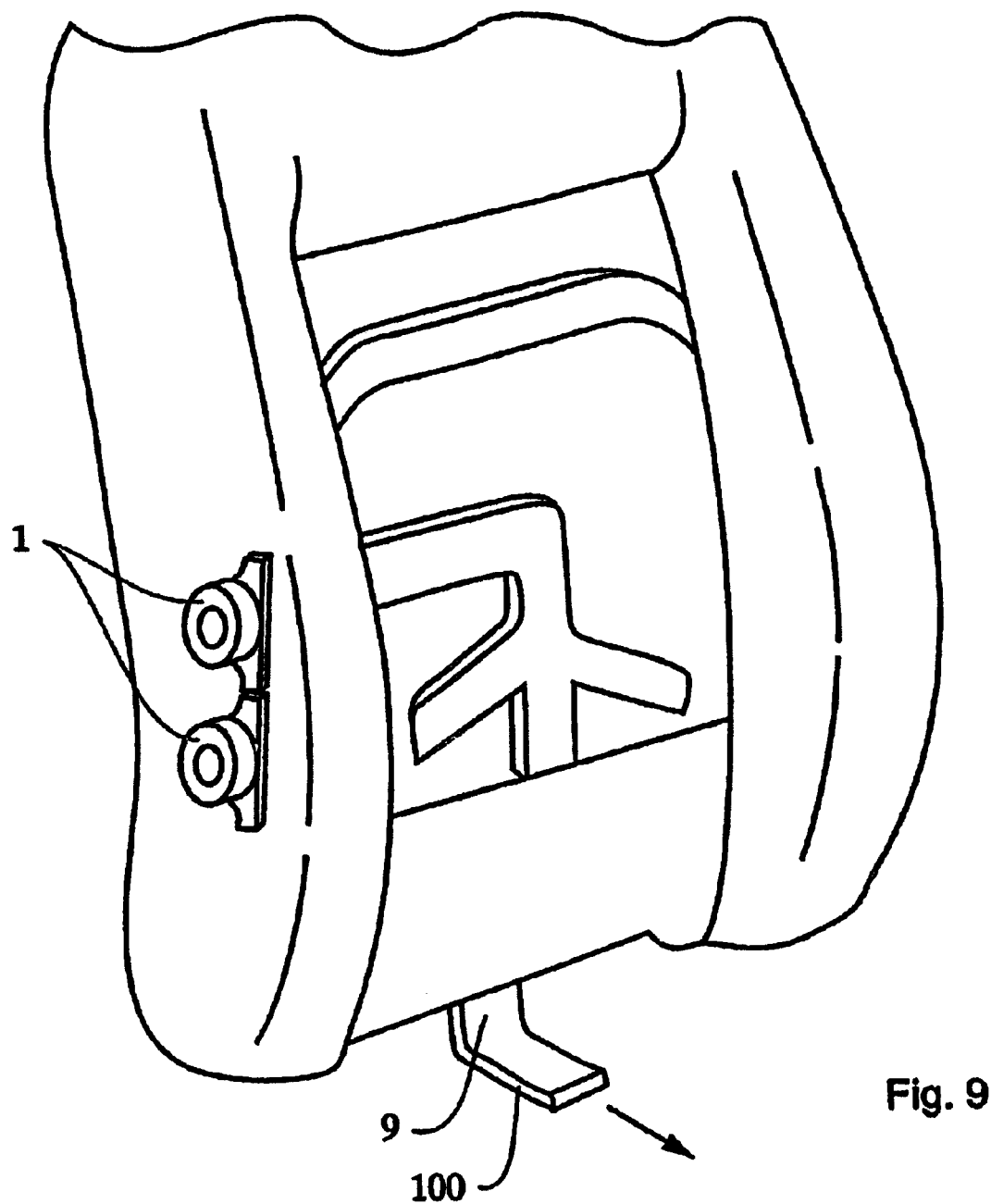
FIG. 9 shows the backrest of a vehicle seat according to one exemplary embodiment.

FIG. 9 illustrates the backrest 31 of a vehicle seat 30 according to one exemplary embodiment with the fan 1 and the connecting element 9 and the distributing section 100 for supplying the seat part 32 (not illustrated in FIG. 9).

Figure 10:
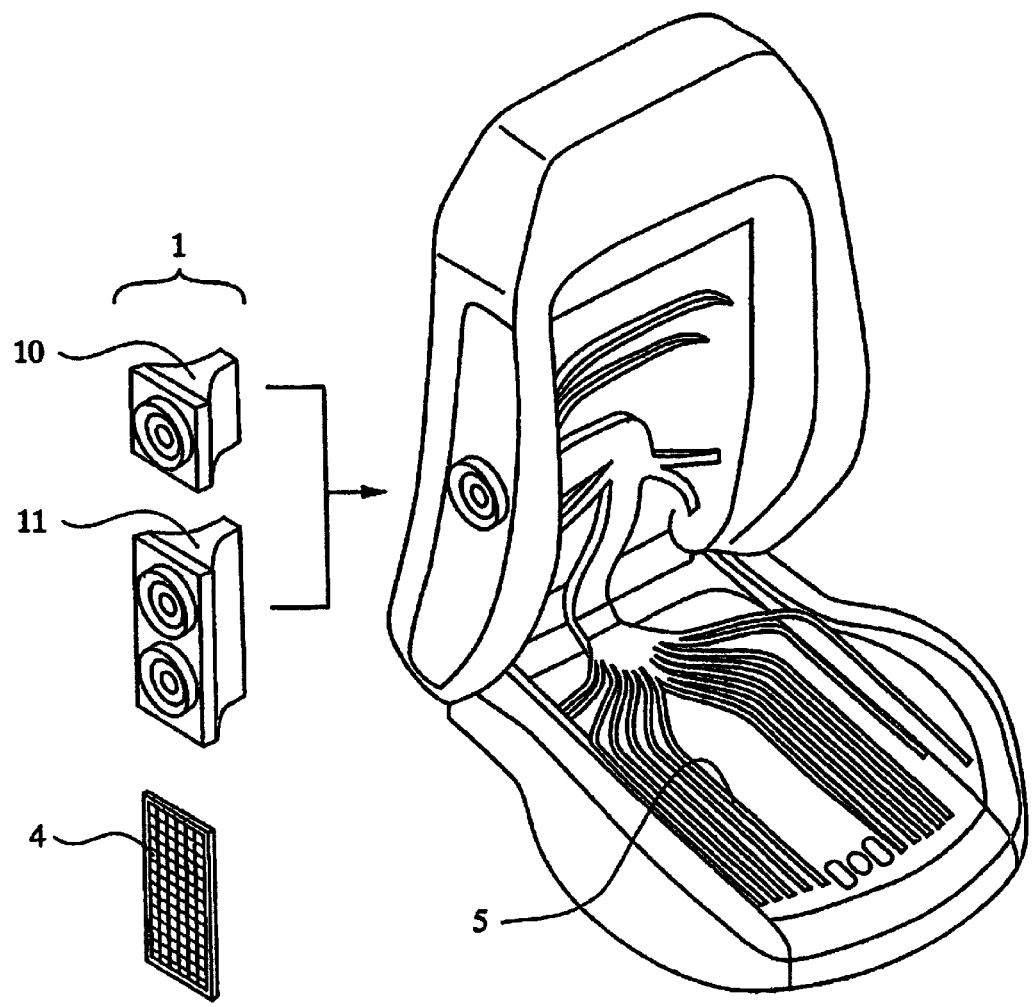
FIG. 10 shows a vehicle seat according to one exemplary embodiment with various embodiments of ventilators which can be installed.

FIG. 10 illustrates a vehicle seat 30 according to another exemplary embodiment with various possibilities of ventilators 1 or fan modules which can be installed. According to one embodiment, instead of a fan 1, it is possible for a fan module 10, 11 to be installed in the seat, the fan module 10, 11 comprising, for example, either one fan or two fans. The air supply opening 2, 4 may then be matched to the particular situation. According to one exemplary embodiment, the fan module 10, 11 is flange-mounted in a modular construction at the side of the seat 30 and is covered with a grille 4, which is provided, for example, as a protective grille. The air duct arms of the air duct 5 that branch into the regions of the usable surface 71 can be seen particularly readily in FIG. 10.

Figure 11:
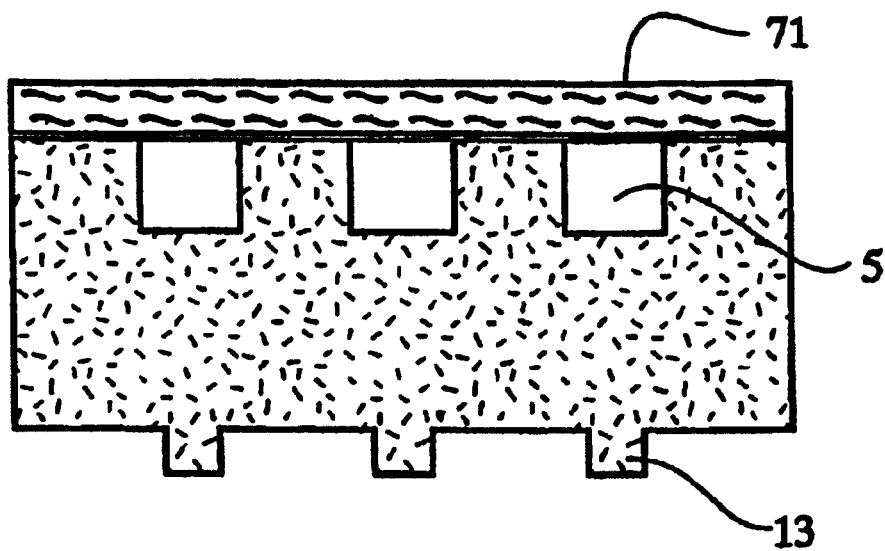
FIGS. 11 and 12 show two sectional illustrations in which compensation elements are shown in an unloaded and loaded state.
Figure 12:
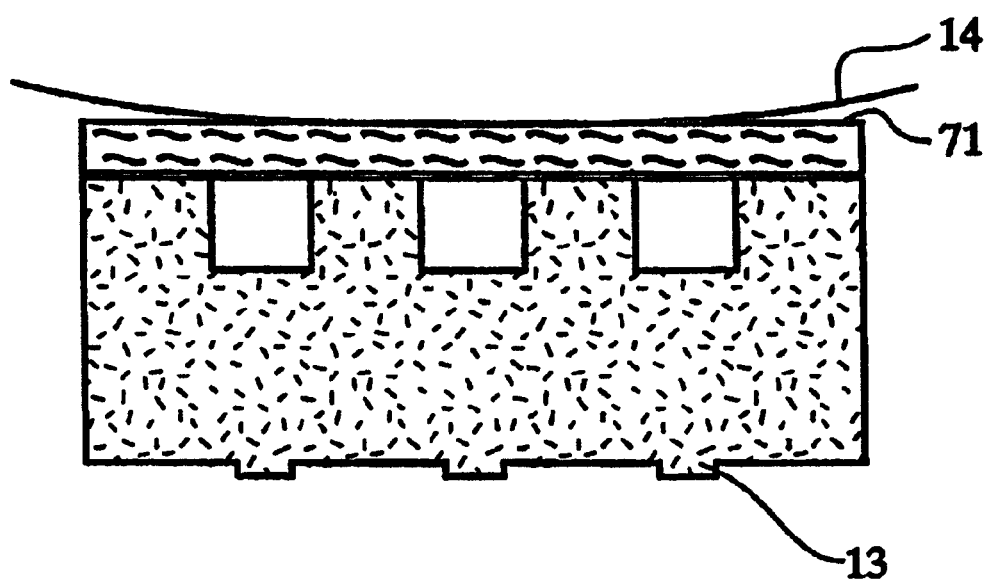

FIGS. 11 and 12 illustrate two sectional illustrations of arms of the air duct 5 in order to show the action of compensation elements 13 which oppose a reduction in the cross section of the air duct 5 when the usable surface 71 of the climatic seat is loaded. Since the cross-sectional reduction in the air ducts 5 in the occupied state leads, because of the loading by a user 14, to an increase in the pressure loss, a reduction in the cross section of the air ducts should be avoided as far as possible. Owing to the fact that the compensation elements 13 are fitted as foam webs 13 on the lower side of the foam material 51 or of the seat cushion 51 (i.e., on the side of the air duct 5 which lies opposite the usable surface 71), in the "occupied" state of the seat 30 these foam webs 13 are deformed rather than the air duct 5 or the arms of the air duct 5 in the vicinity of the usable surface 71. FIG. 11 illustrates the situation in the case of an unoccupied usable surface 71: the foam webs 13 are largely not deformed. FIG. 12 illustrates the situation in the case of an occupied usable surface 71: the foam webs 13 are largely deformed.

Figure 13:
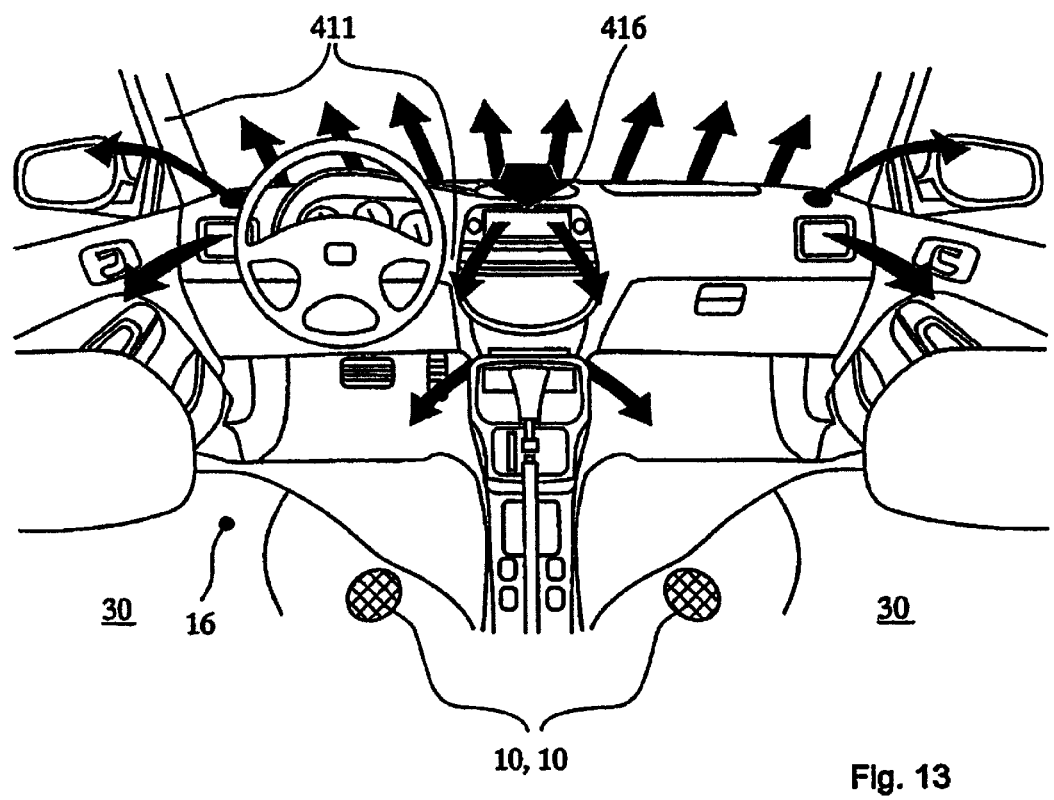
FIG. 13 shows a diagrammatic illustration of a vehicle interior with two vehicle seats according to one exemplary embodiment and air movements within the vehicle interior.

FIG. 13 depicts a diagrammatic illustration of an interior of a vehicle with two climatic seats 30 according to one exemplary embodiment, in order to illustrate air movements. According to one exemplary embodiment, the fan modules 10, 11 are arranged in FIG. 13 at the sides of the backrests of two vehicle seats 30 arranged next to each other. The fan modules 10, 11 are preferably arranged on the vehicle inner side of the seats 30 (i.e., that side of the seat 30 which points into the interior of the vehicle). Airbag modules, for example, may be provided on the outer sides of the vehicle seats, and so the provision of the fan modules 10, 11 on the inner side of the seats 30 helps to avoid space problems. In the case of seats 30 in which an airbag module is not provided on the outer side, a fan 1 or a fan module 10, 11 may also be provided on the outer side. According to another exemplary embodiment, it is also possible to fasten a fan 1 to both the backrest 31 and the seat part 32 of the seat 30 (e.g., on a lateral side of the seat, such as on the inner side of the seat). In this case, the fan 1 fastened to the backrest 31 preferably ventilates the backrest 31 and the fan 1 fastened to the seat part 32 ventilates the seat part 32. When the fan 1 is arranged at the side of the seat 30, the cool air provided by the air-conditioning system of the vehicle is transported from the air nozzles (only provided with arrows in FIG. 13) to the air supply opening 2, 4 of the seat 30 and from there to the usable surface 71, in particular, to the seat surface. This cooling of the seat surface permits a heat flow away from the occupant. By arranging the fan 1 or the fan module 10, 11 at the side of the seat 30 on the inner side of the passenger compartment of the vehicle, the cool and dehumidified air from the air-conditioning system, which reduces the temperature in the interior of the vehicle, can be supplied in a particularly simple and direct manner to the seat and therefore to the user. By contrast, in the case of the fan 1 being arranged under the seat 30 or in an encapsulated region of the backrest 31, the provision of the cold air for cooling the seat would only be possible later on. By means of the resultant close linking of the inside temperature of the vehicle and the seat temperature of the vehicle, the climatic capacity of the seat 30 can be controlled in a particularly simple manner via the inside temperature of the vehicle. As described above, the fan power or the rotational speed of the fan of the seat 30 can therefore be controlled in a simple manner via the air-conditioning system generally present in the vehicle, so that a user of the vehicle sits in a comfortable temperature range and overcoolings, which may have an adverse effect on the health, are not possible.

The temperature sensor 411 and the sunlight sensor 416 continuously measure the thermal loading present in a vehicle and compare this with the desired interior temperature of the vehicle. If the actual value of the interior temperature of the vehicle is greater than the desired value, the power of the air-conditioning system is increased, i.e. more or colder air is transported into the vehicle interior.

When a vehicle is parked, the vehicle interior heats up, particularly because of strong solar irradiation, i.e., the interior temperature of the vehicle increases, and the seat surfaces in particular heat up. During this heating-up process, a temperature stratification forms in the interior of the vehicle, it being warmer in the roof-lining region than in the floor region of the vehicle. Under the action of solar irradiation, in particular, direct solar irradiation, the temperature of the seat surface becomes very high (to an intensified extent with a black leather cover to the seat surface). This seat surface temperature is now to be reduced even in the case of a parked vehicle. When certain limit values are exceeded for the interior temperature measured by the temperature sensor 411 or if a high solar irradiation is measured by the sunlight sensor 416, provision is made for the fan 1 of the climatic seat to start running. The lower air temperature in the region of the fan in comparison to the high seat surface temperature causes heat to be removed from the hot seat surface and the seat surface temperature drops. This cooling effect is particularly effective if in such situations, even in the case of a parked vehicle, the air-conditioning system or another cooling unit is activated and, as a result, cooled air is made available in the interior of the vehicle.

The invention claimed is:

1. A vehicle seat including a seat part having a side and a backrest having a side, at least one of the seat part and the backrest comprising:
   a usable surface having a first part on the backrest and a second part on the seat part, the first part being connected to the second part by a flexible connecting element;
   an air supply opening;
   an air duct extending between the air supply opening and the usable surface, the air duct having at least two air duct arms and a distributing section;
   a ventilator in communication with the air duct for producing an air flow in the air duct; and
   wherein the ventilator is coupled to the side of the backrest, and
   wherein the flexible connecting element makes up part of the air duct and is directly adjoined by the distributing section of the air duct.

2. The vehicle seat of claim 1 wherein the ventilator is configured to direct the airflow from the air supply opening to the usable surface.

3. The vehicle seat of claim 1 wherein the ventilator is configured to direct the airflow from the usable surface to the air supply opening.

4. The vehicle seat of claim 1 wherein the backrest comprises a backrest structure and a backrest upholstery for covering the backrest structure and wherein the ventilator is coupled to the side of one of the backrest structure and the backrest upholstery.

5. The vehicle seat of claim 1 wherein the at least one of the seat part and the backrest further comprises a foam cushion and wherein at least a portion of the air duct is formed in the foam cushion.

6. The vehicle seat of claim 5 further comprising an air permeable layer on the foam material and covering the at least a portion of the air duct in the foam cushion.

7. The vehicle seat of claim 5 wherein the ventilator is coupled to the air supply opening.

8. A vehicle seat having a seat part and a backrest, at least one of the seat part and the backrest comprising:
   a usable surface;
   an air supply opening; and
   an air duct configured to direct air between the air supply opening and the usable surface,
   wherein the air duct has a first cross-sectional area at a first position and a second cross-sectional area at a second position, the first position being closer to the air supply opening than the second position and the second cross-sectional area being less than the first cross-sectional area, and
   wherein the first cross-sectional area and the second cross-sectional area are rectangular and are each defined by a height and a width, and wherein the width of the first cross-sectional area is the same as the width of the second cross-sectional area and the height of the first cross-sectional area is greater than the height of the second cross-sectional area.

9. The vehicle seat of claim 8 wherein the air duct comprises a plurality of arms so that the air duct is distributed over substantially all of the usable surface.

10. The vehicle seat of claim 8 further comprising a foam material having a first side in which at least a portion of the air duct is formed and a second side opposite the first side.

11. The vehicle seat of claim 10 further comprising compensation elements coupled to the second side of the foam material, the compensation elements configured to deform so that the cross-sectional area of the at least a portion of the air duct is maintained when the vehicle seat is occupied.

12. The vehicle seat of claim 8 further comprising a ventilator for producing an air flow in the air duct.

13. The vehicle seat of claim 12 further comprising an operating unit for controlling the operation of the ventilator.

14. The vehicle seat of claim 13 wherein the operating unit is configured to control the operation of the ventilator based on at least one of the temperature of the interior of the vehicle and the temperature of the vehicle seat.

15. The vehicle seat of claim 14 wherein the operating unit is configured to operate the ventilator at a first speed when at least one of the temperature of the interior of the vehicle and the temperature of the vehicle seat exceeds a predetermined temperature limit and at a second speed when at least one of the temperature of the interior of the vehicle and the temperature of the vehicle seat falls within a predetermined temperature range.

16. The vehicle seat of claim 15 wherein the second speed is less than the first speed.

17. The vehicle seat of claim 16 wherein the predetermined temperature range within which the ventilator operates at the second speed is less than the predetermined temperature limit over which the ventilator operates at the first speed.

18. The vehicle seat of claim 17 wherein the second speed is selected from a range of speeds.

19. The vehicle seat of claim 12 wherein the ventilator is coupled to a side of the at least one of the seat part and the backrest.

20. The vehicle seat of claim 19 wherein the ventilator is coupled to a lateral side of the at least one of the seat part and the backrest.

21. The vehicle seat of claim 1 wherein the ventilator is coupled to a lateral side of the backrest.

* * * * *

UNITED STATES PATENT AND TRADEMARK OFFICE
CERTIFICATE OF CORRECTION

| | | |
|---|---|---|
| PATENT NO. | : 7,467,823 B2 | Page 1 of 1 |
| APPLICATION NO. | : 10/552405 | |
| DATED | : December 23, 2008 | |
| INVENTOR(S) | : Hartwich | |

It is certified that error appears in the above-identified patent and that said Letters Patent is hereby corrected as shown below:

On the cover page,

[*] Notice:   Subject to any disclaimer, the term of this patent is extended or adjusted under 35 USC 154(b) by 0 days Delete the phrase "by 0 days" and insert -- by 15 days --

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,467,823 B2 | Page 1 of 1 |
| APPLICATION NO. | : 10/552405 | |
| DATED | : December 23, 2008 | |
| INVENTOR(S) | : Dirk Hartwich | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 88 days.

Signed and Sealed this

Fourteenth Day of December, 2010

David J. Kappos
*Director of the United States Patent and Trademark Office*